Dec. 15, 1936.                    B. H. RAVANELLI                      2,064,217
                    CARBURETOR FOR INTERNAL COMBUSTION ENGINES
                           Filed June 6, 1933                    2 Sheets-Sheet 2
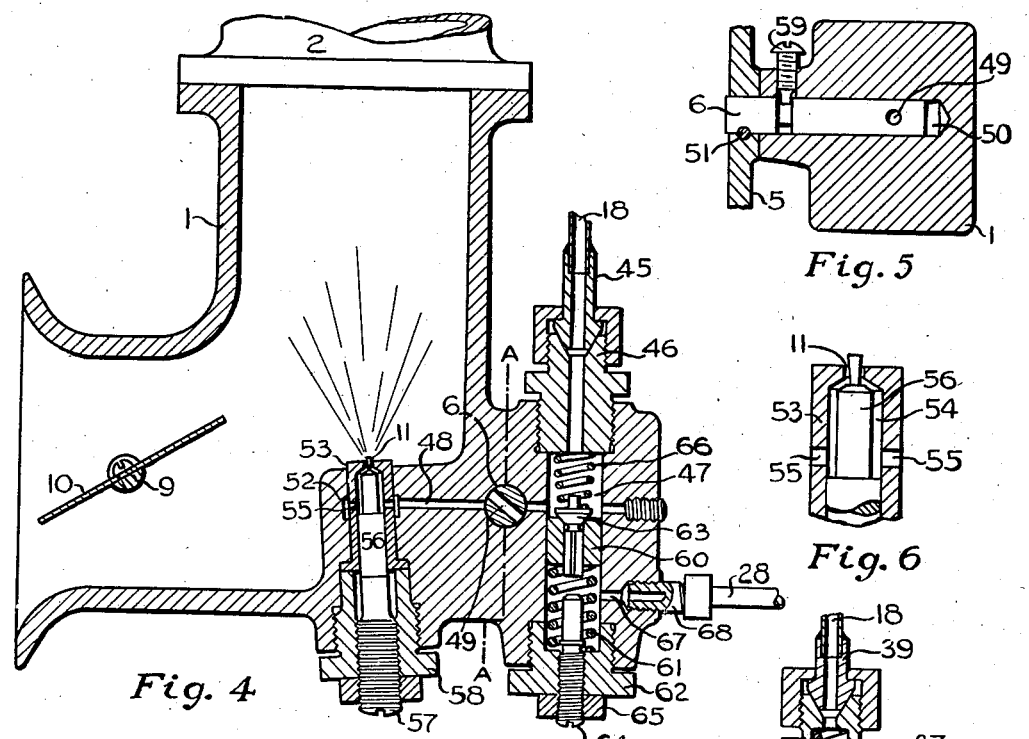
Fig. 4
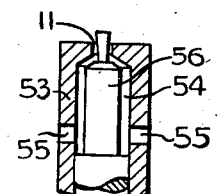
Fig. 5
Fig. 6
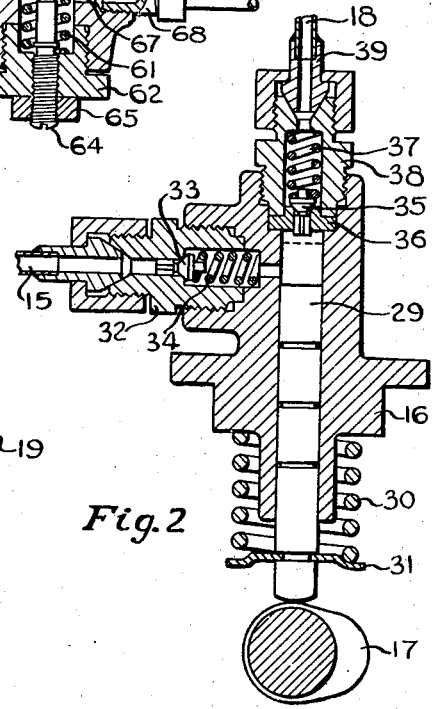
Fig. 2
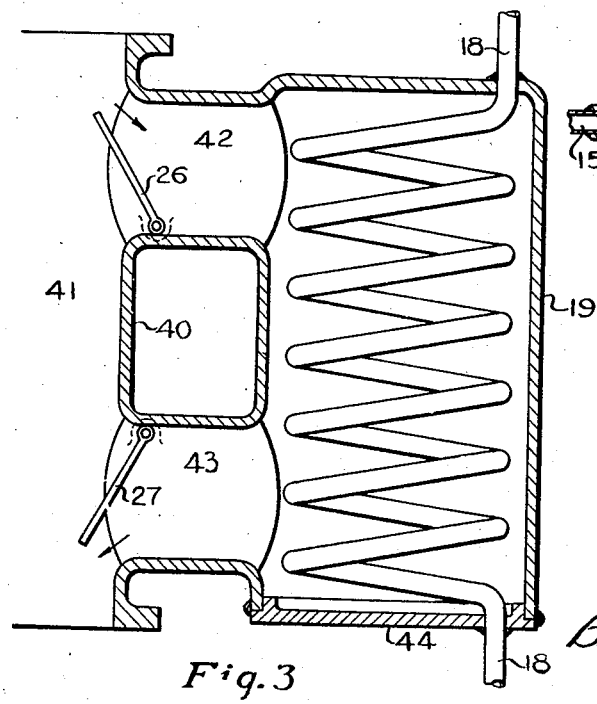
Fig. 3
INVENTOR.
Ben H. Ravanelli Patented Dec. 15, 1936

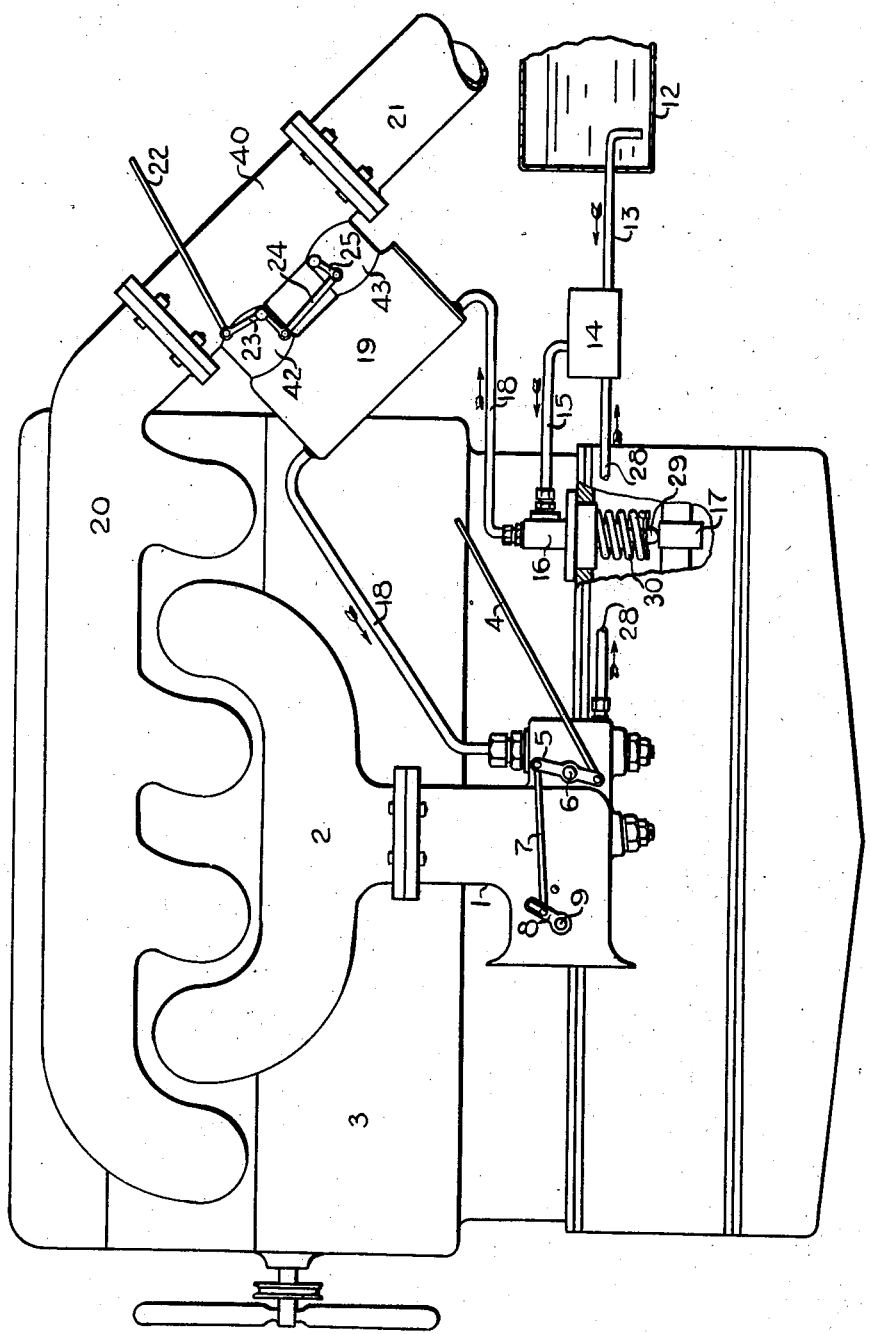

2,064,217

UNITED STATES PATENT OFFICE 2,064,217

CARBURETOR FOR INTERNAL COMBUSTION ENGINES

Ben H. Ravanelli, Austin, Tex.

Application June 6, 1933, Serial No. 674,474

7 Claims. (Cl. 261—36)

This invention relates to carburetors of the kind that are used for supplying fuel to internal combustion engines, and particularly, to devices for supplying nonvolatile as well as volatile fuels to such engines. It provides a means to combine fuel with air so as to secure explosive action or combustion in the engine, a means to positive control, atomize, and vaporize the fuel to be combined with air, and a means to give a steady flow and bypass any excess of the fuel or fuel vapor.

To fully explain the advantages of my invention I shall refer briefly to the operation of well known types of carburetors. The objects of all designs are to give a properly proportioned mixture under different conditions and all depend on air velocity and vacuum, which are controlled by a throttle valve or other means, for operation. The vacuum caused by air flowing through Venturi or restricted openings aspirates fuel through an orifice which is placed in these openings or near them; the orifice size may be controlled but the quantity of fuel aspirated depends on the flow of air primarily and not on the pressure of the fuel. Most carburetors have a float chamber in which the fuel is kept at a certain level by a valve operated by the float. The fuel is supplied to the float chamber by a low pressure pump or other means; the float valve allows only enough fuel to enter to keep the float at a certain level and thus replace the fuel aspirated or used. In some carburetors the mixture of air and fuel is heated by the heat of the exhaust manifold.

With the foregoing in view, this invention operates on the well known principles that fuel will not form explosive mixtures unless well mixed in proper proportion with oxygen or air, that a fuel will be well atomized, thereby helping mixing with air, when injected by pressure through a small orifice, that the volatility of a fuel depends on its temperature, and that Venturi and restricted openings offer resistance to the flow of air.

This invention provides a means independent of suction or air velocity to supply fuel to the air stream caused by suction of a piston in the engine. A control member, manually or automatically operated, determines the proportion of fuel or fuel vapor which is supplied by a pump device to be injected through an orifice, which mixes it with the air stream going into the engine. The air stream is not controlled or throttled except with low power output and starting of the engine. This positive control of the atomized fuel, properly proportions the fuel and air mixture, improves acceleration as the inertia of fuel is decreased by forcing it, makes cold starting easy as atomization helps the fuel to vaporize, eliminates restrictions and Venturi openings thus increasing the volumetric, thermal, and overall efficiencies, is ideal for aircraft engines as it will function in any position, allows supercharging as the fuel quantity will simply be increased to take care of the increased air supply, is easily adjusted for altitude, eliminates part of the noise of suction, and allows use of non-volatile as well as volatile fuels due to the vaporization caused by atomization.

Supplementing the advantages afforded by the control member or positive control, are those derived from heating the fuel by exhaust gas, cooling water, or electricity while under positive control. Due to the high specific heat and latent heat of liquid fuels a large quantity of heat which would be lost by the engine can be conserved by the fuel and used to heat the charge. The principle of this arrangement is to inject fuel which vaporizes instantly into cool air and thereby admit to the engine a maximum percentage of oxygen for perfect combustion. Fuels with low volatility (kerosene and fuel oil) can be used as they will be sufficiently vaporized to form explosive mixtures with air. Higher compression ratios can be used with last mentioned fuels thus increasing the efficiency.

A special means has been provided which is of such design that when an intermittently operating fuel pump is used to feed fuel to the fuel reservoir from a source of supply, the pulsations of the pump will not produce pulsations in the stream of fuel being delivered to the orifice of the carburetor and the excess fuel will be bypassed, thereby controlling the peak pressure.

These last mentioned means have been combined with the other instrumentalities of this invention, all of which will now be described in detail. My carburetor is not to be limited to the form shown, as my invention, as defined in the appended claims, may be embodied in a plurality of forms. Referring now to the accompanying drawings in which:

Figure 1 is a general view in side elevation of an internal combustion engine having the invention applied thereto showing a means of heating the fuel, a means to control the temperature of the fuel, a means of supplying the fuel, and the fuel and throttle controls.

Figure 2 is a cross sectional view of a plunger pump for supplying high pressure fuel.

Figure 3 is a cross sectional view in side elevation of a fuel heating device.

Figure 4 is a cross sectional view in side elevation of the carburetor showing the control member, orifice control, and means to control the flow.

Figure 5 is a cross section taken on the line A—A showing the control member.

Figure 6 is a detail view showing the orifice and regulator.

The term control member as used herein is intended to include a rotary valve, slide valve, piston valve, cock, or any equivalent device for controlling the quantity of fuel forced by pressure through an orifice into the airstream.

A very brief reference to the internal combustion engine to which the attachment of this invention is applied will suffice since it can be made applicable to many different types.

The body 1, Figure 1, of the carburetor is attached by screws to the intake manifold 2, which is attached to the engine 3. To the body 1 is attached the power control rod 4, which if pushed or pulled turns the control member lever 5, carrying the control member 6, and throttle valve lever 8, carrying throttle valve shaft 9, and throttle valve 10, Figure 2. The motion of control member lever 5, is transmitted to throttle valve lever 8 by means of link 7. The levers 8 and 5 are so proportioned that the movement of 8 is about twice that of 5 and that 8 is at the end of its travel when 5 has covered only about one half of its travel. As these levers control the throttle valve shaft 9, carrying throttle valve 10, and control member 6, the movements of these elements (throttle valve and control member), only, will be referred to hereinafter as the proportioning of the levers 5 and 8 are not a part of this invention.

The fuel comes from tank 12, through fuel line 13, into filter or receptacle 14, through fuel line 15, into high pressure pump 16. The pump 16 is attached by bolts to the engine 3 and is actuated by cam 17 which is operated by the engine 3, and in this case is the valve camshaft. The fuel is pumped through fuel line 18 into heat container 19. The heat container 19 is part of a casting 40 which is intermediate to the exhaust manifold 20 and exhaust pipe 21. The heat, in this case, is supplied by the exhaust gas, coming from the exhaust manifold 20. The quantity of exhaust gas, shunted through the heat container 19, and the temperature of the fuel therein, is controlled by the rod 22, manually or automatically operated, which is attached to the valve lever 23, carrying link 24 and valve lever 25; the valve levers 23 and 25 carry valves 26 and 27, Figure 3, which open and close simultaneously. The heating device is not essential but is a means providing positive vaporization of the fuel.

The fuel passes from the heat container 19, through the fuel line 18, into the carburetor body 1. The control member 6 determines the quantity of this fuel that is injected through the orifice 11, Figure 4, into the air stream in the intake manifold 2. Due to leakage and a bypass, there will be a discharge of fuel from the carburetor body 1, through fuel line 28 into filter or receptacle 14.

The mouth of the carburetor body 1 is shown facing the front of the engine for the reason that the blast of air from the fan and the pressure of the air caused by the linear velocity of the engine through it can be used to get a slight supercharging effect.

The plunger 29, Figure 2, of the pump 16 is held against the face of the cam 17, by means of spring 30, which is supported by the pump body at one end and a removable retainer plate 31, which fits in an annular groove in the plunger 29, at the other. The plunger 29, of the pump 16, is actuated by the cam 17, which is operated by the engine 3. On the downstroke of the plunger 29 fuel is sucked from the fuel line 15, through fitting 32 and intake valve 33, which is held against its seat in the fitting 32, by the spring 34. The plunger 29 sucks in a quantity of fuel, which is about equal to its displacement, represented by the dotted line and top of plunger 29. On the upstroke of the plunger 29, the fuel sucked in is discharged through the discharge valve 35, which is held against its seat 36 by spring 37 held by fitting 38, into fittings 38, 39, and fuel line 18.

The pump 16 is shown as a plunger pump with a constant discharge for a certain speed of the cam 17. The discharge does not have to be constant and could be varied by manipulating either the intake or discharge valve, by varying the stroke of the pump, or by other means. Although I have shown a plunger type pump for discharging the fuel under pressure, it is to be clearly understood that the invention is not to be so limited as any suitable means for building up a pressure can be used. Any such means would give similar effects as the control member described hereinafter that is, the fuel would be supplied under high pressure and it would be positively controlled.

The fuel is forced from the pump 16 into fuel line 18 which enters the heat container 19, Figure 3. The heat container 19 is a part of the casting 40 which is attached by screws intermediate to the exhaust manifold 20 and the exhaust pipe 21. The casting 40 consists of a main passage 41 and two perpendicular passages 42 and 43 connecting with the heat container 19, which is parallel to the main passage 41. The heat container 19 is supplied with a removable bottom 44. The fuel line 18 is inserted through a hole in the removable bottom 44, wound into several coils, inserted in the heat container 19 with end extending through the hole in the upper part of it. The removable bottom 44 is then pressed in the heat container 50 and welded at its edges. The openings around the fuel line 18 at the entrance and exist of heat container are also welded so as to prevent leakage. The two passages, 42 and 43, connecting the main passage 41 and the heat container 19, are supplied with valves 26 and 27 which operate simultaneously and shunt the desired quantity of the exhaust gas through the heat container and thus heat the fuel in the coil 18 and also control its temperature.

After passing through the heating device the fuel continues through fuel line 18, fittings 45 and 46, Figure 4, and into reservoir 47 of the carburetor body 1. The fuel then passes through channel 48 which has the control member 6 placed in it so as to control the flow through it. The control member 6, Figure 5, is shown as a barrel type valve with a hole 49 drilled in it. It is held in place, so that hole 49 will mate with channel 48, in the drilled hole 50 by screw 59 which fits in the annular groove in it; it is operated by lever 5 which is attached to it by pin 51. By rotating the control member 6 though an angle of about 90° the flow of fuel through channel 48 can be varied from a maximum to no flow.

The fuel is led by channel 48 to the annular passage 52 around the nozzle 53. The fuel enters the nozzle chamber 54, Figure 6, through radially drilled holes 55 and passes through the opening between the needle valve 56 and the orifice 11 into the air stream, caused by suction of pistons, flowing into the intake manifold 2.

The opening between the needle valve 56 and orifice 11 determines the degree of atomization and due to its size tends to keep the flow through it steady. The degree of atomization can be adjusted by means of screw 57, Figure 4, held by thimble 58 which is seated by threaded engagement in the body 1 and against the nozzle 53 which is against a shoulder in the body 1. The needle valve 56 is held at the lower end against a screw 57 by the fuel pressure. The small tapered projection on the needle valve is very important as it determines the spray angle and fineness of the spray of fuel injected into the airstream.

The fuel nozzle 53 is set at an angle in the body so as to keep the air stream from blowing the spray of fuel against the rear of the body 1.

The air stream, caused by the suction of the pistons in the engine 3, enters the mouth of the carburetor by the throttle valve 10, passes the nozzle 53 which sprays fuel into it, and enters the intake manifold 2. The throttle valve 10 allows sufficient air to enter for best mixture with fuel at low outputs of the engine, but the throttle valve 10 is wide open when the control member 6 is approximately half open. Due to the very small quantities of fuel necessary at low power outputs and idling, the air must be throttled so as to obtain the air-fuel ratio. From half to full outputs of the engine, the throttle valve remains wide open and thus offers no resistance to the flow of air. Fuel is simply supplied by pressure to the air stream, in proper proportion, by the control member 6 from half to full outputs of the engine. This differs from present types of carburetors in that the air is not restricted or controlled, except at low power output, but is allowed to enter uncontrolled and fuel is simply forced into it in an atomized form, in proper proportion. This gives higher volumetric efficiency and thus better operation.

Thus a means has been described in which fuel under pressure is positively controlled, atomized, vaporized, and injected into the airstream entering an internal combustion engine.

To facilitate the best operation of the above means, supplementary means have been provided so as to maintain a practically constant pressure on the fuel being supplied to the orifice for both the intake and discharge strokes of the high pressure plunger pump 16 and so as to control the pressure and bypass excess fuel. The supplementary means will now be described.

The fuel is forced by pressure into chamber 47, Figure 4, in body 1 of the carburetor. The fuel pressure causes the piston 60, which is a lap fit with chamber 47, to compress spring 61 held by thimble 62, which is screwed in the body 1. On the discharge stroke of the pump 16 the spring 61 is compressed but on the intake stroke the spring 61 expands and thus keeps a practically constant pressure on the fuel and control member for both intake and discharge strokes of the pump 16. If the fuel pressure is not held constant, for a certain speed, the result will be that the fuel will not be supplied to the air stream steadily, that unequal charges will enter the cylinders, and that operation will be irregular. The object of this method of carburetion is to thoroughly mix the proper proportion of fuel with air. It can be readily seen that the supply of fuel should be introduced at a steady rate for best mixture at any speed.

The pump 16 was designed to give sufficient fuel at full power output of the engine. This is more fuel than required at lower outputs so I have provided a means which bypasses the fuel when there is an excess and thus controls the pressure.

Consider the case, when the engine is operating at full power, the fuel is suddenly shut off by means of control member 6. The pump 16 continues to supply fuel to the chamber 47 as the engine decelerates although no fuel is allowed to pass by the control member 6. The piston 60, due to the pressure of the fuel, moves toward the bottom of the carburetor body 1, thus compressing the spring 61. The spring 61 is compressed until the end of the valve 63 touches the pressure adjusting screw 64, which is screwed in thimble 62 and locked by nut 65. If there is a further increase in pressure, after the end of the valve 63 touches the pressure adjusting screw 64, it will force piston 60 further and thus open valve 63 against spring 66 and allow fuel to be bypassed, until pressure drops, through channel 67, fitting 68 and into fuel line 28. The screw 64 is adjustable in thimble 62 so as to give most any desired pressure of the fuel.

Having thus described my invention, what I claim as new and desire to secure by Letters Patent is:

1. A carburetor for an internal combustion engine comprising, a mixing chamber, means for supplying an unrestricted stream of air to the mixing chamber, means for injecting fuel under pressure into the air stream, means for preheating said fuel before injection, spring operated means for maintaining a constant pressure of the fuel injected, and a spring actuated valve coacting with said spring operated means for bypassing the fuel whenever the pressure becomes excessive.

2. A carburetor for an internal combustion engine comprising, a body having an unrestricted enlarged air passage extending therethrough and free from ports at each end, whereby the suction of the motor may draw a steady volume of air through the passage without reducing it into a plurality of air streams, a mixing chamber in said passage intermediate the ends thereof, means for injecting fuel into the volume of air passing through the mixing chamber, means for positively controlling the quantity of fuel injected, whereby a proper mixture of fuel and air is obtained, means for heating the fuel before injection, a spring-pressed piston for maintaining a constant pressure of the fuel injected under normal conditions, and a spring loaded valve carried by said piston for by-passing the fuel when the pressure becomes excessive.

3. A carburetor for an internal combustion engine comprising, a mixing chamber, a fuel supply tank connected with the mixing chamber, a nozzle in the connection and open to the chamber, means for injecting fuel under pressure through the nozzle into the air stream passing through said chamber, a spring-operated piston in the connection between the tank and nozzle for maintaining a constant pressure of the fuel injected, and a spring loaded valve carried by said piston for by-passing the fuel back to the tank when the pressure becomes excessive.

4. A carburetor for an internal combustion engine including, a mixing chamber, means for supplying an unrestricted stream of air to the mixing chamber, means for injecting a fuel under pressure into the air stream passing through the mixing chamber, a piston subjected to the fuel pressure injected into the chamber, a spring exerting its pressure against the piston for maintaining the pressure of the fuel constant, and a spring loaded valve carried by the piston for by-passing the fuel when the pressure thereof becomes excessive.

5. A carburetor for an internal combustion engine including, a mixing chamber, means for supplying an unrestricted stream of air to the mixing chamber, means for injecting a fuel under pressure into the air stream passing through the mixing chamber, a piston subjected to the fuel pressure injected into the chamber, a spring exerting its pressure against the piston for maintaining the pressure of the fuel constant, a spring loaded valve carried by the piston, and means for engaging the valve for opening said valve to by-pass the fuel when the pressure of said fuel becomes excessive and moves the piston a predetermined distance.

6. A carburetor for internal combustion engines comprising, a mixing chamber having an unrestricted and enlarged air inlet opening and passage for permitting an amplified stream of air to be drawn to said chamber, means for injecting fuel into said air stream in said chamber, means for positively controlling the quantity of fuel injected into said air stream, whereby a proper mixture of fuel and air is obtained, spring operated means for maintaining a constant pressure of the fuel injected, a control valve in the inlet of the mixing chamber, and a connection between said valve and the control means for the fuel quantity, whereby upon initial movement of said fuel control means the control valve is operated relative to the operation of said fuel control means, and after said fuel control means has reached half throttle the valve is wide open, thereby providing an unrestricted air inlet while said fuel control means is moved from half to full throttle.

7. A carburetor for an internal combustion engine including, a housing, a mixing chamber in the housing, means for supplying air to said chamber, a fuel receiving chamber in the housing, the housing having a passage connecting the fuel receiving chamber and the mixing chamber, means for introducing fuel under pressure into the fuel receiving chamber, spring actuated means within said receiving chamber for maintaining a constant pressure of the fuel being forced through the passage into the mixing chamber, and a spring loaded valve co-acting with said spring actuated means for by-passing the fuel from the receiving chamber when the pressure of said fuel becomes excessive.

BEN H. RAVANELLI.